(12) United States Patent
Yamazaki

(10) Patent No.: US 7,573,473 B2
(45) Date of Patent: Aug. 11, 2009

(54) IMAGE DISPLAY DEVICE, IMAGE DISPLAY SYSTEM AND ELECTRONIC DEVICE

(75) Inventor: Tatsuro Yamazaki, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 11/152,171

(22) Filed: Jun. 15, 2005

(65) Prior Publication Data

US 2005/0285849 A1    Dec. 29, 2005

(30) Foreign Application Priority Data

Jun. 28, 2004    (JP) .............................. 2004-189287

(51) Int. Cl.
*G09G 5/00*    (2006.01)
(52) U.S. Cl. ........................ 345/212; 345/211; 345/213; 345/214
(58) Field of Classification Search .......... 345/211–214
See application file for complete search history.

(56) References Cited

U.S. PATENT DOCUMENTS

| | | | |
|---|---|---|---|
| 5,331,345 A | 7/1994 | Akimoto et al. ............. | 348/297 |
| 6,078,751 A | 6/2000 | Yamazaki et al. ............. | 396/55 |
| 6,278,842 B1 | 8/2001 | Yamazaki et al. ............. | 396/55 |
| 6,924,843 B1 | 8/2005 | Yamazaki et al. ......... | 348/423.1 |
| 6,947,018 B1 | 9/2005 | Yamazaki .................. | 345/75.2 |
| 7,057,667 B1 | 6/2006 | Mori et al. .................. | 348/554 |
| 2005/0030263 A1 | 2/2005 | Yamazaki .................. | 345/75.1 |
| 2005/0156869 A1 | 7/2005 | Mori et al. .................. | 345/104 |
| 2005/0168645 A1 | 8/2005 | Yamazaki .................. | 348/655 |

FOREIGN PATENT DOCUMENTS

| | | | |
|---|---|---|---|
| JP | 10-207742 | | 8/1998 |
| JP | 2002-218343 | * | 8/2002 |

* cited by examiner

*Primary Examiner*—Richard Hjerpe
*Assistant Examiner*—Leonid Shapiro
(74) *Attorney, Agent, or Firm*—Fitzpatrick, Cella, Harper & Scinto

(57) ABSTRACT

Power source control pertaining to a plurality of control units is made to be easy. Moreover, the productivity and the versatility of a control program are improved. A logical operation unit performing a logical operation of a power source control signal outputted from each control unit is provided. The power supply state of a power source is determined in accordance with an operation result outputted from the logical operation unit.

9 Claims, 5 Drawing Sheets

IMAGE DISPLAY DEVICE, IMAGE DISPLAY SYSTEM AND ELECTRONIC DEVICE

BACKGROUND OF THE INVENTION

1. Field of the Invention

The present invention relates to power source control in an image display device, an image display system and an electronic device each equipped with a plurality of control units.

2. Description of Related Art

The document 1 (Japanese Patent Application Laid-Open No. 2002-218343) discloses a configuration in which a single CPU sends a command to a power source control device to control a power supply state (e.g. on/off) of a power source as an example of power source control in a TV receiver.

Moreover, the document 2 (Japanese Patent Application Laid-Open No. H10-207742) discloses information processing equipment installing a power source controlling processor therein for controlling a main power source for a main processor.

The latest electronic device is often constituted as an integrated system composed of a plurality of control units. For example, an image display device is provided with a plurality of control units such as a panel driving unit supplying a driving signal to a display panel and an image processing unit outputting an image signal to the panel driving unit. Each control unit has a memory, which stores programs, and a CPU, and builds a peculiar control system. In such an electronic device, it is general that a single CPU bearing power source control receives a status signal from each control unit, and that the CPU controls a power source in order to realize a preferable operation as the whole system.

It is necessary to design a power source controlling CPU and its program in accordance with the specifications of the state signals of all of the control units. Consequently, when not all of the specifications are determined, the program of the power source controlling CPU cannot be completed, and it was difficult to create an effective program. Moreover, there is a problem that, when an alteration of the specifications pertaining to the sequence of turning on and off the power source occurred in another control unit, the program of the power source controlling CPU should be also altered and consequently the productivity of producing the program is bad.

On the other hand, recently, an electronic device building a volatile memory of a large capacity therein has also appeared. In such a device, a sequence of turning on and off a power source for stopping the power source after saving data stored in the volatile memory in a nonvolatile memory is sometimes requested. In such a sequence, because a waiting time until the turning off of the power source varies according to the data amount to be written in the nonvolatile memory, the complexity of power source control increases. Moreover, although it is necessary to take a safe margin into account for the waiting time, the larger the margin is set to be, the lower the response to the request of turning on or off the power source falls. Consequently, there is also a problem of causing a deterioration of operationality.

SUMMARY OF THE INVENTION

The present invention is made in view of the above actual condition. It is an object of the present invention to provide a technique for making easy the power source control related to a plurality of control units.

Moreover, it is another object of the present invention to provide a technique for improving the productivity and the versatility of a control program.

Moreover, it is a further object of the present invention to provide a technique for controlling the power supply state of a power source safely and promptly.

In order to attain the above objects, the present invention adopts the following configurations.

That is, the first invention is characterized by an image display device including:

a panel driving unit supplying a driving signal to a display panel;

an image processing unit outputting an image signal to the panel driving unit;

a power source supplying electric power to the panel driving unit and the image processing unit; and a logical operation unit performing a logical operation of a power source control signal outputted from each of the panel driving unit and the image processing unit, wherein a power supply state of the power source is controlled by an output of the logical operation unit.

The second invention is characterized by an image display system including an image display device and a peripheral device connected to the image display device, wherein the image display device includes:

a power source supplying electric power to an inside of the image display device and the peripheral device; and a logical operation unit performing a logical operation of a power source control signal outputted from each of the inside of the image display device and the peripheral device, wherein a power supply state of the power source is controlled by an output of the logical operation unit.

The third invention is characterized by an electronic device including a plurality of functional blocks controlled by CPUs arranged in the respective functional blocks, a power source supplying electric power to the plurality of functional blocks, and a logical operation unit performing logical operations of power source control signals outputted from the CPUs, wherein the logical operation unit performs power source turning on control when the logical operation unit receives at least one power source control signal requiring turning on the power source, and performs power source turning off control when the logical operation unit receives power source control signals all of which request turning off the power source.

The fourth invention is characterized by an electronic device including:

a plurality of control units each outputting an on signal when electric power is necessary and outputting an off signal when the electric power is unnecessary;

a power source supplying electric power to the plurality of control units; and a logical operation unit receiving the on signal or the off signal outputted from each of the control units, the logical operation unit outputting an on signal to the power source when the logical operation unit receives at least one of the on signals, the logical operation unit outputting an off signal to the power source when signals received by the logical operation unit are all the off signals.

According to the present invention, the power source control pertaining to a plurality of control units can be made to be easy. Moreover, the productivity and the versatility of a control program can be improved. Moreover, the power supply state of a power source can be quickly and safely controlled.

DETAILED DESCRIPTION OF THE PREFERRED EMBODIMENTS

In the following, the suitable embodiments of the present invention are illustratively described in detail with reference to the attached drawings. Incidentally, an image display device and image display systems are illustrated as the embodiments of electronic devices of the present invention here.

First Embodiment (Configuration of Image Display Device)

Figure 1:
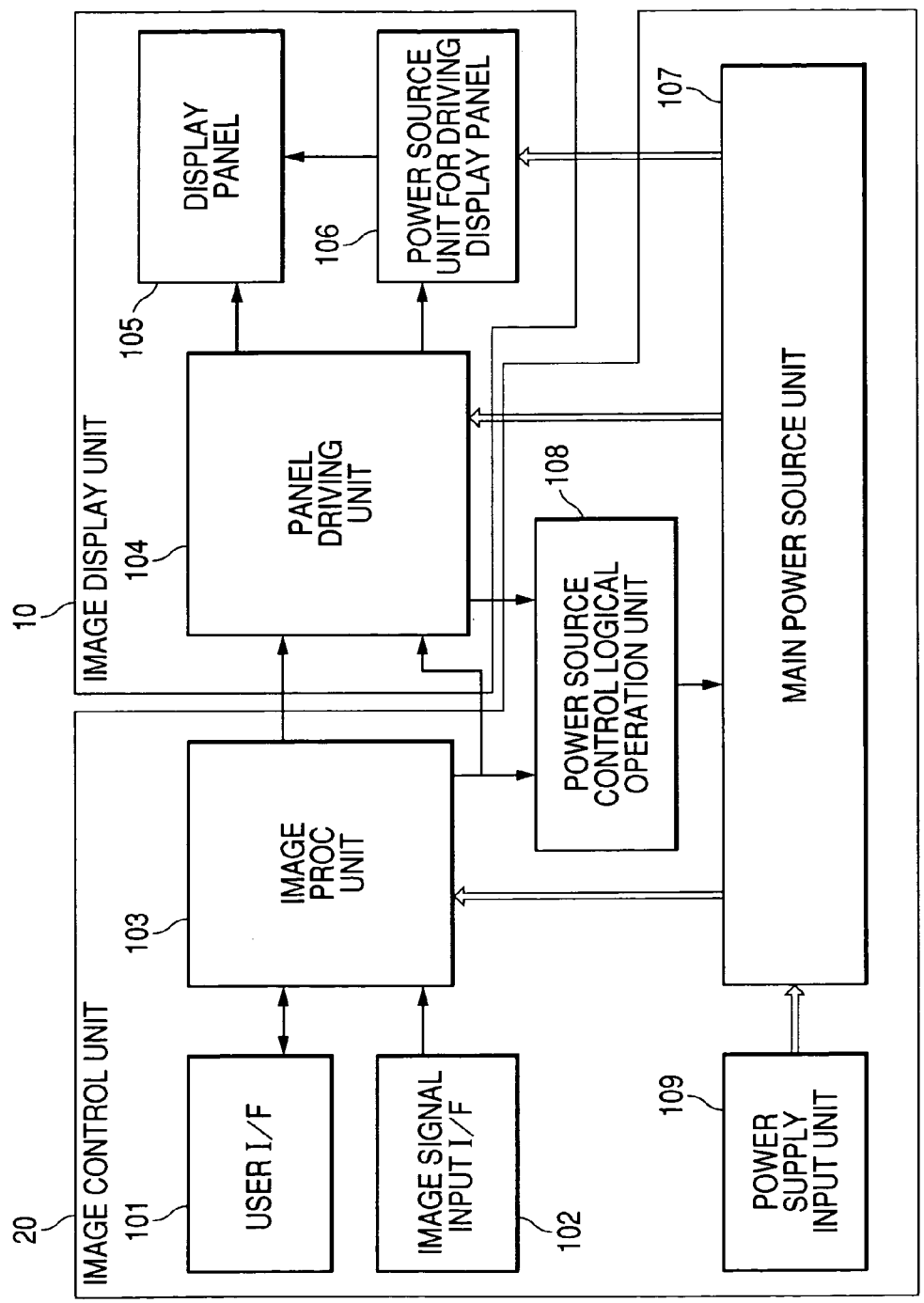
FIG. 1 is a block diagram showing the configuration of an image display device according to the first embodiment of the present invention.

FIG. 1 is a block diagram of an image display device 202 according to the first embodiment of the present invention. The image display device 202 is composed of an image control unit 20 and an image display unit 10. The image control unit 20 is equipped with a user I/F (interface) 101, an image signal input I/F 102, an image processing unit 103, a main power source unit 107, a power source control logical operation unit 108 and a power supply input unit 109. The image display unit 10 is equipped with a panel driving unit 104, a display panel 105 and a power source unit 106 for driving the display panel (also called a display panel driving power source unit 106).

The user I/F 101 receives an on/off request signal of the power source of the device from a user, and transmits the signal to the image processing unit 103. The user I/F 101 is equipped with, for example, a remote control light receiving portion, switches which the user operates, and the like.

The image signal input I/F 102 receives an image signal from the outside, and transmits the signal to the image processing unit 103.

The image processing unit 103 is equipped with a CPU for performing operation control in the image processing unit 103, and an image signal processing unit performing signal conversion of an inputted image signal according to the drive specifications of the display panel 105. The "performing the signal conversion of an inputted image signal according to the drive specifications of the display panel 105" here means convening the image signal inputted from the image signal input I/F 102 into a displaying image signal which a viewer can regard the displaying image signal as a preferable one in accordance with the drive specifications of the display panel 105 regulated using the resolution, the display speed (such as the refresh rate and the scanning frequency), the luminous performance (such as the luminance and the color reproduction range), and the like of the display panel 105.

The display panel 105 has a function of performing an image display by modulating the amount of emitting light based on an image signal. As the display panel 105, there are, for example, a CRT, a liquid crystal panel, an EL (electroluminescence) panel, a PDP (plasma display panel), an SED (surface-conduction electron-emitter display) panel arranging surface conduction electron-emitting devices in the shape of an array, an FED panel arranging carbon fibers in the shape of an array, and the like.

The display panel driving power source unit 106 receives electric power supply from the main power source unit 107, and has a function of generating driving bias voltages necessary for making the display panel 105 emit light.

The panel driving unit 104 receives an image signal from the image processing unit 103. The image signal has received the conversion processing to a resolution, a drive rate, luminance/color and the like which are suitable for driving the display panel 105. Then, the panel driving unit 104 drives the display panel 105 by a modulation method suitable for the display panel 105. The panel driving unit 104 is equipped with a CPU for controlling circuits which are mounted in the panel driving unit 104 and the display panel driving power source unit 106.

The power supply input unit 109 is a connecting unit for connecting means (such as an AC power cable and a battery) for supplying electric power to the main power source unit 107.

The main power source unit 107 is a power source which receives electric power supply from the power supply input unit 109 and performs on/off control for determining a power supply state in accordance with an output signal from the power source control logical operation unit 108. At the time of turning on, the main power source unit 107 performs power supply to the image processing unit 103, the panel driving unit 104 and the display panel driving power source unit 106 after converting the electric power into respectively desired voltage values.

Figure 2:
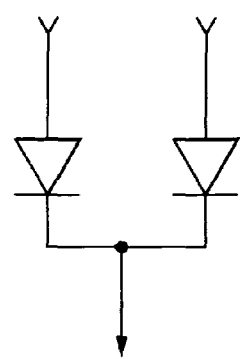
FIG. 2 is a view showing an example of the configuration of a power source control logical operation unit in FIG. 1.

FIG. 2 is a view showing an example of the power source control logical operation unit 108 in FIG. 1. Here, a power source control signal from the controlling CPU of the image processing unit 103 and a power source control signal from the controlling CPU of the panel driving unit 104 are inputted into diodes, respectively, and a logical sum operation of them by the diodes is performed. The operation result is outputted to the main power source unit 107.

In the configuration described above, the image processing unit 103 and the panel driving unit 104 severally correspond to the control units or the functional blocks of the present invention. The main power source unit 107 corresponds to the power source of the present invention. The power source control logical operation unit 108 corresponds to the logical operation unit of the present invention.

(Power Source Control Sequence)

Figure 3:
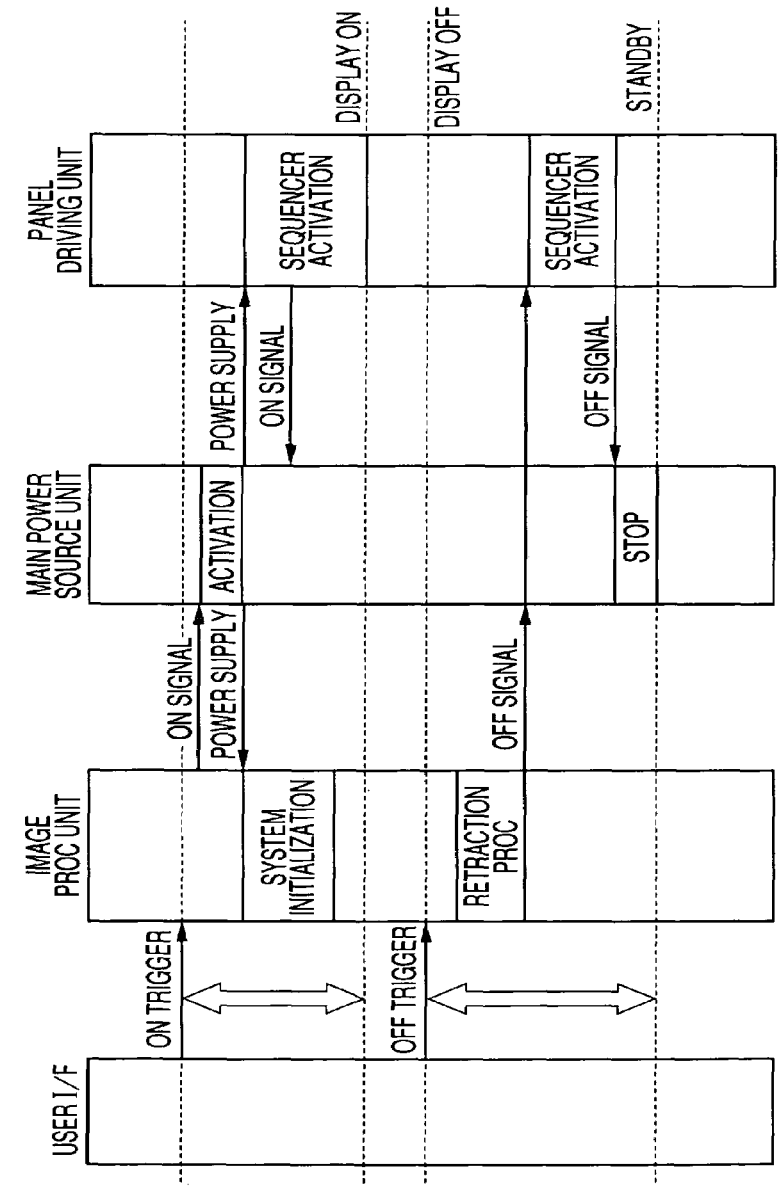
FIG. 3 is a view showing an example of a power source control sequence.
Figure 4:
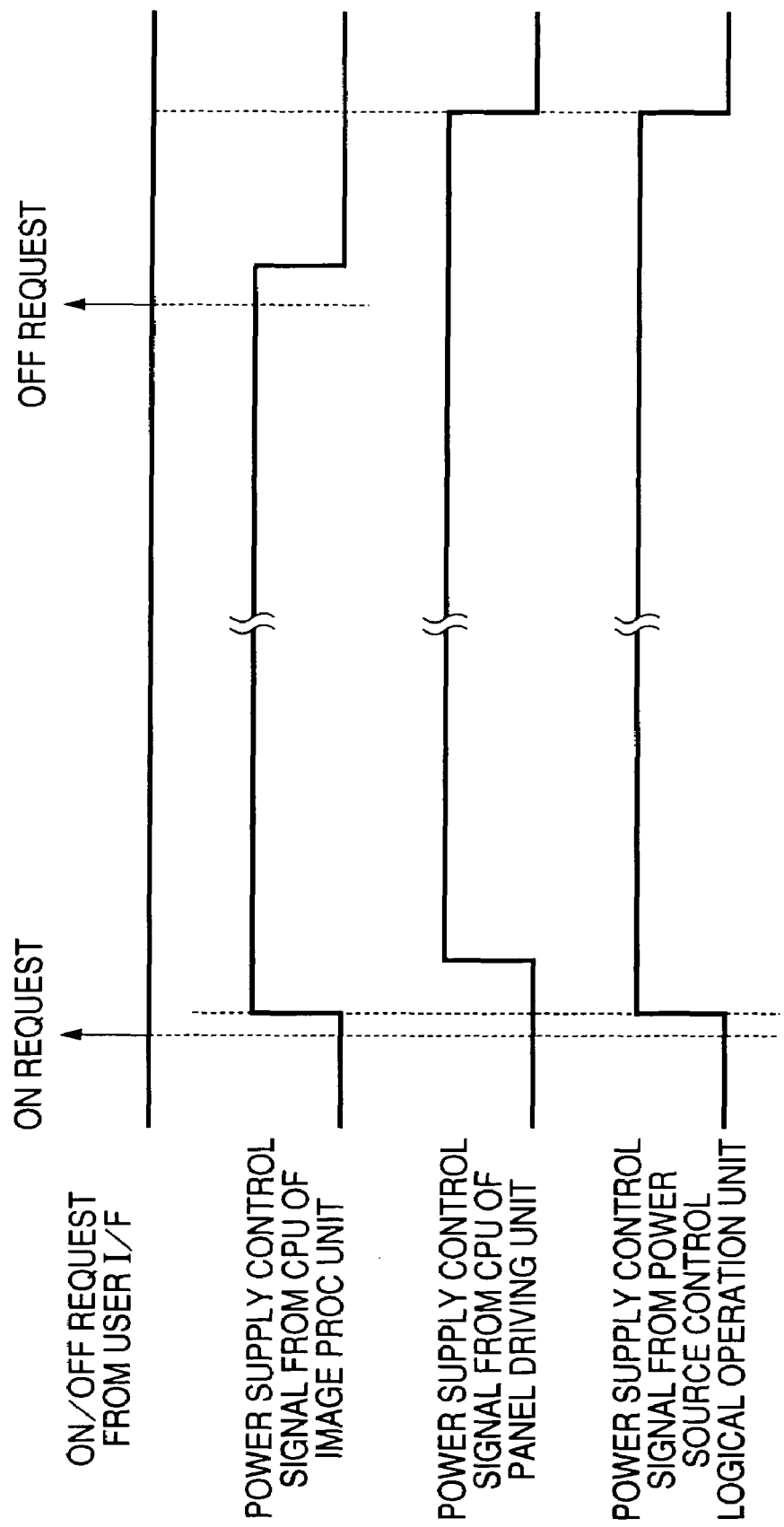
FIG. 4 is a view showing examples of input and output signals in the power source control logical operation unit.

FIG. 3 is a view showing an example of the operation sequence of each unit at the time of turning on/off the power source. FIG. 4 is a view showing an example of the input and output operation of the power source control logical operation unit 108.

(1) Power Source Turning On Sequence

When a user performs a power source turning on operation using a remote control or a power source switch, the user I/F 101 receives a power source turning on request, and transmits an on trigger signal to the image processing unit 103.

The image processing unit 103 having received the on trigger outputs a power source control signal requesting the power source turning on to the power source control logical operation unit 108. Incidentally, in the present embodiment, as shown in FIG. 4, the power source control signal requesting the power source turning on (hereinafter referred to as "on signal") is set to the high level, and the power source control signal requesting the power source turning off (hereinafter referred to as "off signal") is set to the low level.

At this time, the power source control logical operation unit 108 is in the state of receiving on signal from the image processing unit 103, and of receiving the off signal from the panel driving unit 104. The logical sum operation of these signals is performed, and an on signal is outputted to the main power source unit 107 as the operation result. That is, when the power source control logical operation unit 108 receives at least one on signal, the power source control logical operation unit 108 outputs an on signal. Because the processing time which the logical sum operation needs is so small that it can be neglected, the main power source unit 107 receives the on signal almost at the same time when the on signal is outputted from the image processing unit 103.

When the main power source unit 107 receives the on signal from the power source control logical operation unit 108, the main power source unit 107 performs a starting circuit operation, and starts electric power supply to the image processing unit 103, the panel driving unit 104 and the display panel driving power source unit 106.

Incidentally, the power source of the circuits concerning input and output of the power source controlling signals against the user I/F 101, the image processing unit 103 and the power source control logical operation unit 108 is arranged in the main power source unit 107 apart from the main power source, which supplies electric power to other circuits, and the former power source operates even in a standby mode.

Each CPU of the image processing unit 103 and the panel driving unit 104 receives electric power supply from the main power source unit 107, and performs a system initialization processing operation. Then, each CPU shifts to an on mode from the standby mode. After the end of initialization, the CPU in the panel driving unit 104 starts the sequence control of the display panel driving power source unit 106 in order to perform bias voltage application to the display panel 105 in a desired power source starting procedure. Just before the start of this sequence control or during the execution thereof, the CPU in the panel driving unit 104 outputs an on signal to the power source control logical operation unit 108.

In this state, even if a user suddenly performs a power source turning off request, or if some abnormality occurs in the image processing unit 103, and the on signal output from the image processing unit 103 is lost, then the electric power supply from the main power source unit 107 is not abruptly intercepted. The reason is that, because the on signal from the panel driving unit 104 is inputted into the power source control logical operation unit 108, the output (the operation result) of the power source control logical operation unit 108 is still the on signal regardless of the existence of the on signal output of the image processing unit 103.

After the CPU of the image processing unit 103 has ended the system initialization processing and the CPU of the panel driving unit 104 has completed the activation sequence processing, image signals inputted into the image signal input I/F 102 are displayed on the display panel 105.

(2) Power Source Turning Off Sequence

When the user performs a power source turning off operation using the remote control or the power switch, the user I/F 101 receives a power source turning off request, and transmits an off trigger signal to the image processing unit 103.

When the CPU of the image processing unit 103 receives the off trigger signal, the CPU starts retraction processing to shift to the standby mode. When the retraction processing has been completed, the CPU of the image processing unit 103 outputs an off signal to the power source control logical operation unit 108. Because the on signal from the panel driving unit 104 is inputted into the power source control logical operation unit 108 at this time, the electric power supply of the main power source unit 107 does not stop yet. Moreover, the CPU of the image processing unit 103 transmits the information of the occurrence of an off trigger request to the CPU of the panel driving unit 104.

When the CPU of the panel driving unit 104 receives the off trigger signal, the CPU starts the retraction processing of the circuits in the panel driving unit 104, and starts the sequence control of the display panel driving power source unit 106 in accordance with a predetermined procedure in order to cancel the bias voltage application to the display panel 105.

The retraction processing hereupon is mainly processing writing adjusting data and the like stored in the volatile memory to the nonvolatile memory. That is, in the CPU in the image processing unit 103, the data concerning image display such as sound volume, luminance and color adjusting data, which have been set by the user, is saved in the nonvolatile memory. Moreover, in the panel driving unit 104, the sequence control for preventing an abnormal display of the display panel 105 and the saving processing of adjusting data related to a panel drive are performed.

Then, the CPU of the panel driving unit 104 outputs an off signal to the power source control logical operation unit 108 after the completion of the retraction processing and a stop sequence.

As shown in FIG. 4, after both of the CPU of the image processing unit 103 and the CPU of the panel driving unit 104 have entered in the states of outputting the off signals, the power source control logical operation unit 108 outputs an off signal to the main power source unit 107.

When the main power source unit 107 receives the off signal from the power source control logical operation unit 108, the main power source unit 107 stops the electric power supply to the image processing unit 103, the panel driving unit 104 and the display panel driving power source unit 106. By this, the whole device is set to be in the standby mode.

As described above, according to the configuration of the present embodiment, when any of the control units (the image processing unit 103 or the panel driving unit 104) needs electric power, electric power supply is performed from the main power source unit 107, and electric power supply is not stopped until electric power becomes unnecessary for all of the control units. Consequently, efficient power source control as the whole device is realizable.

Moreover, there are the following advantages by realizing such a power source turning on/off control operation by the power source control logical operation unit 108, which is independent of the control units and the main power source unit 107.

It is suitable for each control unit and the main power source unit 107 to perform sequence control, retraction processing, power source control and the like based on only their own convenience without considering the states of the other control units or the whole device. Consequently, it becomes unnecessary to adjust the specifications of a control program with other control units and the like on the occasion of the design of the specifications. Thereby, an alteration of a specification occurring in a certain control unit does not influence the other control units. In addition, the productivity and the versatility of software is heightened and it becomes possible to achieve the reduction of the whole cost.

Moreover, even when adding a new control unit, suitable power source control can be realized only by connecting on signals and off signals outputted from the control unit to the input of the power source control logical operation unit 108. When addition of a control unit is assumed, it is preferable to design extendibility beforehand to the number of input signals of the power source control logical operation unit 108.

Moreover, because the present embodiment confirms that electric power has become unnecessary in all control units and performs the stop of the power source, the present embodiment does not need to have any margin in waiting time until the turning off of the power source, although the margin is necessary for the prior art. Consequently, it becomes possible to realize the rapid turning on and off of the power source.

Incidentally, although the image processing unit 103 and the panel driving unit 104 have been illustrated as the control units (functional blocks) in the present embodiment, of course, the number of the control units is not limited to two. For example, a case where, furthermore, the display panel driving power source unit 106 contains a dedicated CPU therein can be considered. In this case, it is suitable to control the main power source based on the logical operation results of the power source control signals outputted from three CPUs.

Moreover, although the case of the power source turning on/off request by the operation of a user has been illustrated in the present embodiment, it is suitable to receive the power source turning on/off request from an external control system to execute the power source control sequence mentioned above based on the received power source turning on/off request in the case where the image display device 1 is incorporated in an integrated control system, or the like.

Moreover, although in the present embodiment the configuration in which a power source turning on/off trigger is transmitted to the panel driving unit 104 after the on/off trigger has been received by the image processing unit 103 is shown, the on/off trigger may be received by a CPU other than that of the image processing unit 103 or by all of the CPU's in the device.

Second Embodiment

Figure 5:
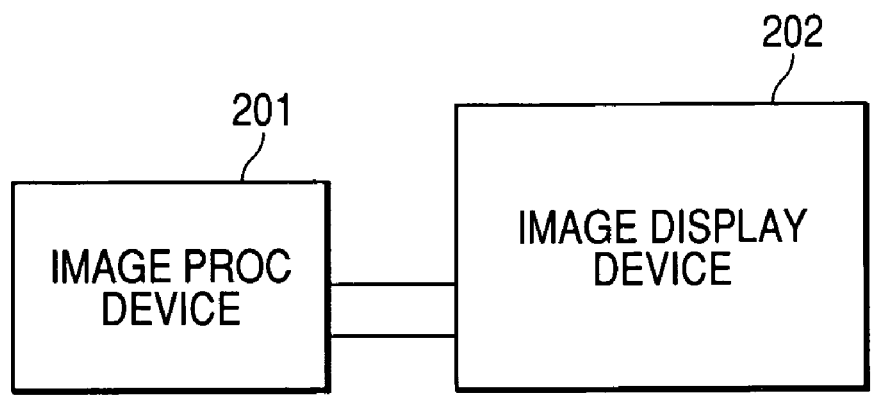
FIG. 5 is a block diagram showing the configuration of an image display system according to the second embodiment of the present invention.

FIG. 5 is a block diagram of an image display system of the second embodiment of the present invention. The image control unit 20 and the image display unit 10 in the first embodiment have severally a housing different from each other as an image processing device 201 and an image display device 202, respectively.

An image signal having a converted resolution, a converted drive rate, a converted luminance/color and the like which are suitable for driving the display panel 105 is transmitted to the image display device 202 from the image processing device 201, and electric power supply to the panel driving unit 104 and the display panel driving power source unit 106 is performed.

A power source control signal from the CPU of the panel driving unit 104 to the power source control logical operation unit 108 is transmitted to the image processing device 201 from the image display device 202.

Even in the case where the power source and the control unit are installed in the separated housings in such a way, the same operations and effects as those of the first embodiment can be expressed by applying the same power source control sequence as that of the first embodiment.

Incidentally, in the example of FIG. 5, although the main power source unit 107 and the power source control logical operation unit 108 are mounted on the side of the image processing device 201, the system configuration is not limited to such a configuration. For example, it is also preferable to mount the main power source unit 107 and the power source control logical operation unit 108 on the side of the image display device 202 for miniaturizing the size of the image processing device 201.

Although electric power is supplied to the image display device 202 from the image processing device 201 in the present embodiment, it is also possible to supply electric power from the image display device 202 to the image processing device 201 on the contrary.

Third Embodiment

Figure 6:
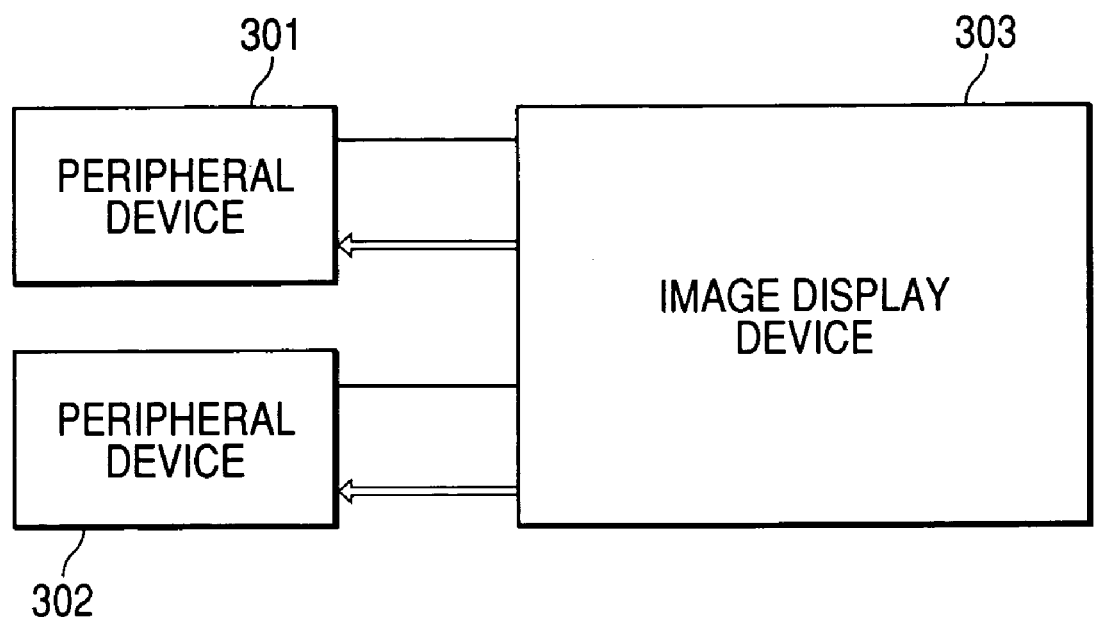
FIG. 6 is a block diagram showing the configuration of an image display system according to the third embodiment of the present invention.

The present embodiment is an image display system in which a plurality of peripheral devices 301 and 302 is connected to an image display device 303 as shown in FIG. 6.

The image display device 303 is one consisting of the image control unit 20, which is equipped with the main power source unit and the power source control logical operation unit, and the image display unit 10, both of which have been stated with regard to the embodiment 1. The peripheral devices 301 and 302 are severally equipped with a user I/F, an image signal input I/F and an image processing unit, which are mutually different. The peripheral devices 301 and 302 are, for example, severally a VTR, a DVD recorder, a DVD player, a HD recorder, a digital camera, a digital video camera or the like.

An image signal, a power source control signal and the like are transmitted to the image display device 303 from the peripheral devices 301 and 302. Moreover, a power source is supplied to the peripheral devices 301 and 302 from the image display device 303.

The power source control logical operation unit performs the logical operation of the power source control signal outputted from each of the inside of the image display device 303 and the peripheral devices 301 and 302. The power supply state of the main power source unit is controlled by the output of the power source control logical operation unit. Although the example of being provided with the two peripheral devices is shown in the present embodiment, the number of the peripheral devices may be one, or three or more.

According to the present configuration, it becomes unnecessary to provide a power source on each side of the peripheral devices 301 and 302, and the miniaturization and the lowering of the cost of the peripheral devices can be achieved.

Fourth Embodiment

Figure 7:
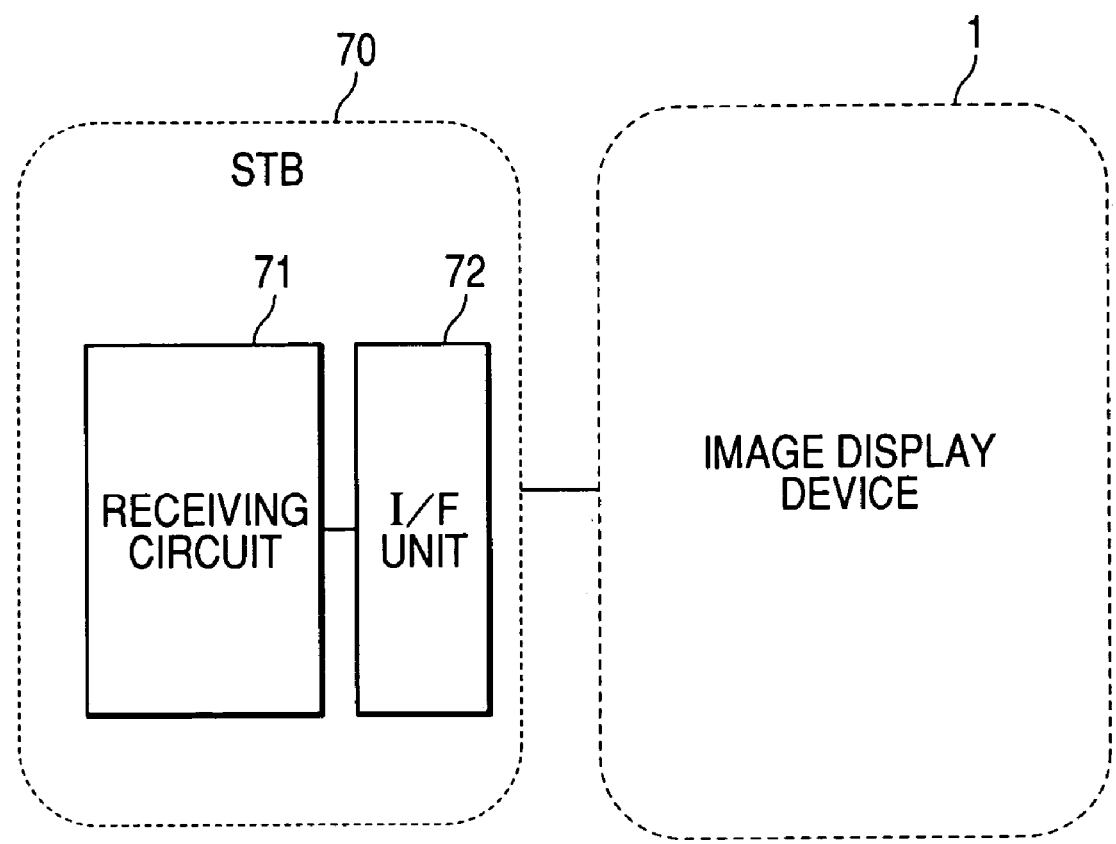
FIG. 7 is a block diagram showing the configuration of a television device according to the fourth embodiment of the present invention.

FIG. 7 is a block diagram of a television device using the image display device 1 described with regard to the first embodiment. A receiving circuit 71 is composed of a tuner, a decoder and the like. The receiving circuit 71 receives television signals of satellite broadcasting, ground waves and the like, and data broadcasting and the like through a network, and outputs decoded image data to an I/F unit 72. In the receiving circuit 71, a γ correction circuit, a resolution conversion circuit and the like are included. The I/F unit 72 converts the image data into the display format of the display panel 105, and outputs an image signal to the image display device 1. The receiving circuit 71 and the I/F unit 72 may be housed in a housing separated from the housing of the image display device 1 as a set top box (STB 70), or may be housed in a housing integrated to one body with the housing of the image display device 1.

Other Embodiments

Incidentally, although the image display devices have been described as an example in the embodiments described above, the present invention is not necessarily limited to the image display device. As long as an electronic device (electronic equipment) is one composed of a plurality of control units (functional blocks) severally equipped with a CPU, the present invention is preferably applicable to such an electronic device.

That is, the electronic device has a logical operation unit and a power source unit. The logical operation unit performs the logical operation of a power source control signal outputted from each CPU in response to a user's operation. When the logical operation unit receives at least one power source control signal requesting turning on a power source, the logical operation unit performs power source turning on control. When the logical operation unit receives power source control signals all requesting the turning off of the power source, the logical operation unit performs the power source turning off control. Thus, the power source of the electronic device is controlled.

Moreover, in the case where the electronic device is configured in order to be able to transmit the existence of an off request to the other control CPUs when any one CPU receives an off request, an automatic shutdown can be realized, and it is still more desirable.

Furthermore, the control unit may have a form of detecting, for example, an operation state of the electronic device to output an on signal automatically when electric power is necessary, and to output an off signal automatically when electric power is unnecessary even if there is no user's operation. The logical operation unit receives the on signal or the off signal outputted from each of the control units. When the logical operation unit receives at least one on signal, the logical operation unit outputs the on signal to the power source. When all of the received signals are the off signals, the logical operation unit outputs an off signal to the power source. By adopting such a configuration, it can be possible to make the electronic device to be one having an energy-saving function.

This application claims priority from Japanese Patent Application No. 2004-189287 filed on Jun. 28, 2004, which is hereby incorporated by reference herein.

What is claimed is:

1. An image display device comprising:
   a panel driving unit supplying a driving signal to a display panel, wherein said panel driving unit outputs a power source control signal;
   an image processing unit outputting an image signal to said panel driving unit, wherein said image processing unit outputs a power source control signal different from the power source control signal outputted by said panel driving unit;
   a power source supplying electric power to said panel driving unit and said image processing unit; and
   a logical operation unit, to which the power source control signals respectively outputted by said panel driving unit and said image processing unit are inputted, performing a logical operation based on the inputted power source control signals outputted by said panel driving unit and said image processing unit,
   wherein a power supply state of said power source is controlled by an output of said logical operation unit, and
   wherein in the case that said image processing unit is outputting the power source control signal to request power on and said panel driving unit is outputting the power source control signal to request power off, in response to said panel driving unit receiving the electric power from said power source, said panel driving unit outputs the power source control signal to request power on.

2. An image display device according to claim 1, wherein said logical operation unit performs a logical sum operation of the power source control signal.

3. An image display system including an image display device and a peripheral device connected to said image display device, wherein said image display device and said peripheral device respectively output mutually different power source control signals, and wherein said image display device comprises:
   a power source supplying electric power to an inside of said image display device and said peripheral device; and
   a logical operation unit, to which the power source control signals respectively outputted by said image display device and said peripheral device are inputted, performing a logical operation based on the inputted power source control signals outputted by said image display device and said peripheral device,
   wherein a power supply state of said power source is controlled by an output of said logical operation unit, and
   wherein in the case that one of said image display device and said peripheral device is outputting the power source control signal to request power on and the other of said image display device and said peripheral device is outputting the power source control signal to request power off, in response to the other of said image display device and said peripheral device receiving the electric power from said power source, that device outputs the power source control signal to request power on.

4. An electronic device comprising a plurality of functional blocks controlled by CPUs arranged in the respective functional blocks, a power source supplying electric power to the plurality of functional blocks, and a logical operation unit performing logical operations of power source control signals outputted from the CPUs,
   wherein said logical operation unit performs power source turning on control when said logical operation unit receives at least one power source control signal requesting turning on said power source, and performs power source turning off control when said logical operation unit receives power source control signals all of which request turning off said power source,
   wherein in the case that one of the CPUs is outputting the power source control signal requesting turning on said power source and another of the CPUs is outputting the power source control signal requesting turning off said power source, in response to the functional block of the another of the CPUs receiving the electric power from said power source, that CPU outputs the power source control signal requesting turning on said power source.

5. An electronic device comprising:
   a plurality of control units each outputting an on signal when electric power is necessary and outputting an off signal when the electric power is unnecessary;

a power source supplying the electric power to said plurality of control units; and a logical operation unit receiving the on signal or the off signal outputted from each of said control units, said logical operation unit outputting an on signal to said power source when said logical operation unit receives at least one of the on signals, and said logical operation unit outputting an off signal to said power source when signals received by said logical operation unit are all the off signals, wherein in the case that one of said control units is outputting the on signal and another of said control units is outputting the off signal, in response to the another of said control units receiving the electric power from said power source, that control unit outputs the on signal.

6. A television device comprising:

an image display device according to claim 1; and a receiving circuit receiving a television signal to output an image signal to said image display device.

7. A control method of an image display device, said method comprising the steps of:

supplying a driving signal to a display panel from a panel driving unit, wherein the panel driving unit outputs a power source control signal;

outputting an image signal to the panel driving unit from an image processing unit wherein the image processing unit outputs a power source control signal different from the power source control signal outputted by the panel driving unit;

supplying electric power to the panel driving unit and the image processing unit;

performing a logical operation based on inputted power source control signals outputted by the panel driving unit and the image processing unit; and determining a supply state of the electric power based on an operation result of the logical operation; and wherein in the case that the image processing unit is outputting the power source control signal to request power on and the panel driving unit is outputting the power source control signal to request power off in response to the panel driving unit receiving the electric power, the panel driving unit outputs the power source control signal to request power on.

8. A power source control method of an electronic device composed of a plurality of functional blocks and a power source, said method comprising the steps of:

outputting power source control signals from the functional blocks;

performing power source turning on control when at least one of the power source control signals is a signal requesting turning on the power source; and performing power source turning off control when all of the power source control signals are signals requesting turning off the power source, wherein in the case that one of the functional blocks is outputting the power source control signal requesting turning on the power source and another of the functional blocks is outputting the power source control signal requesting turning off the power source, in response to the another functional block receiving power from the power source, the another functional block outputs the power source control signal requesting turning on the power source.

9. A power source control method of an electronic device according to claim 8, wherein the functional blocks severally include a CPU outputting the power source control signals.

* * * * *